(12) United States Patent
Moon et al.

(10) Patent No.: US 10,845,940 B2
(45) Date of Patent: Nov. 24, 2020

(54) ELECTRONIC DEVICE AND DISPLAY METHOD OF ELECTRONIC DEVICE

(71) Applicant: SAMSUNG ELECTRONICS CO., LTD., Suwon-si (KR)

(72) Inventors: Tae Yong Moon, Gumi-si (KR); Hye Won Oh, Gumi-si (KR); Hyun Woo Kim, Daegu (KR); Jun Kyu Park, Gumi-si (KR); In Wook Song, Seoul (KR); Eun Yeung Lee, Gumi-si (KR); Cheong Jae Lee, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 277 days.

(21) Appl. No.: 15/768,913

(22) PCT Filed: Nov. 22, 2016

(86) PCT No.: PCT/KR2016/013496
§ 371 (c)(1),
(2) Date: Apr. 17, 2018

(87) PCT Pub. No.: WO2017/099392
PCT Pub. Date: Jun. 15, 2017

(65) Prior Publication Data
US 2019/0079654 A1 Mar. 14, 2019

(30) Foreign Application Priority Data

Dec. 11, 2015 (KR) .......................... 10-2015-0177220

(51) Int. Cl.
*G06F 3/0481* (2013.01)
*G06F 3/0488* (2013.01)
(Continued)

(52) U.S. Cl.
CPC ........ *G06F 3/04812* (2013.01); *G06F 1/1626* (2013.01); *G06F 3/048* (2013.01);
(Continued)

(58) Field of Classification Search
CPC .... G06F 3/04812; G06F 3/0482; G06F 3/048; G06F 3/0414; G06F 16/54;
(Continued)

(56) References Cited

U.S. PATENT DOCUMENTS 7,312,785 B2 12/2007 Tsuk et al.
7,710,393 B2 5/2010 Tsuk et al.
(Continued)

FOREIGN PATENT DOCUMENTS

EP 2 741 193 6/2014
JP 2011-210138 10/2011
(Continued)

OTHER PUBLICATIONS

Extended European Search Report dated Oct. 1, 2018 for European Patent Application No. 16873258.4 (9 pages).
(Continued)

*Primary Examiner* — Abhishek Sarma
(74) *Attorney, Agent, or Firm* — Nixon & Vanderhye, P.C.

(57) ABSTRACT

An electronic device according to various embodiments of the present invention may comprise: a display; an input module for receiving a user input; and a processor configured to generate an image group including a plurality of images according to a designated condition, display a first object indicating an image group on a display, and display a second object for exploring the plurality of images included in the image group at a location corresponding to
(Continued)

a location where a user input is received when the user input for the first object is received. Also, other embodiments are possible.

13 Claims, 14 Drawing Sheets

(51) Int. Cl.
  *G06F 1/16* (2006.01)
  *G06F 3/0485* (2013.01)
  *G06F 16/54* (2019.01)
  *H04M 1/725* (2006.01)
  *G06F 3/048* (2013.01)
  *G06F 3/0482* (2013.01)
  *G06F 3/041* (2006.01)

(52) U.S. Cl.
  CPC .......... *G06F 3/0414* (2013.01); *G06F 3/0482* (2013.01); *G06F 3/0488* (2013.01); *G06F 3/04855* (2013.01); *G06F 16/54* (2019.01); *H04M 1/725* (2013.01); *G06F 2203/0339* (2013.01)

(58) Field of Classification Search
  CPC .. G06F 3/04855; G06F 1/1626; G06F 3/0488; G06F 2203/0339; H04M 1/725
  See application file for complete search history.

(56) References Cited

U.S. PATENT DOCUMENTS

| | | | |
|---|---|---|---|
| 8,223,268 B2 | 7/2012 | Fujiwara et al. | |
| 8,860,674 B2 | 10/2014 | Lee et al. | |
| 8,952,886 B2 | 2/2015 | Tsuk et al. | |
| 9,009,626 B2 | 4/2015 | Tsuk et al. | |
| 9,471,216 B2 | 10/2016 | Lee et al. | |
| 9,823,832 B2 | 11/2017 | Shikolay | |
| 9,864,481 B2 | 1/2018 | Misawa | |
| 9,977,518 B2 | 5/2018 | Tsuk et al. | |
| 10,078,421 B2 | 9/2018 | Jeon | |
| 2003/0076301 A1 | 4/2003 | Tsuk et al. | |
| 2007/0080936 A1 | 4/2007 | Tsuk et al. | |
| 2008/0094352 A1 | 4/2008 | Tsuk et al. | |
| 2008/0098330 A1 | 4/2008 | Tsuk et al. | |
| 2009/0237562 A1 | 9/2009 | Fujiwara et al. | |
| 2011/0016390 A1 | 1/2011 | Oh et al. | |
| 2011/0157046 A1 | 6/2011 | Lee et al. | |
| 2011/0246942 A1 | 10/2011 | Misawa | |
| 2014/0157200 A1 | 6/2014 | Jeon | |
| 2014/0292760 A1 | 10/2014 | Shikolay | |
| 2015/0012877 A1 | 1/2015 | Lee et al. | |
| 2015/0212702 A1* | 7/2015 | Kim | G06F 3/04842 715/838 |
| 2015/0248175 A1 | 9/2015 | Tsuk et al. | |
| 2017/0003867 A1 | 1/2017 | Lee et al. | |

FOREIGN PATENT DOCUMENTS

| | | |
|---|---|---|
| KR | 10-2009-0100300 | 9/2009 |
| KR | 10-2010-0090382 | 8/2010 |
| KR | 10-2012-0033659 | 4/2012 |
| KR | 10-2014-0122292 | 10/2014 |
| KR | 10-2015-0051655 | 5/2015 |
| KR | 10-2015-0090740 | 8/2015 |

OTHER PUBLICATIONS

International Search Report for PCT/KR2016/013496, dated Mar. 2, 2017, 4 pages.
Written Opinion of the ISA for PCT/KR2016/013496, dated Mar. 2, 2017, 5 pages.
Communication pursuant to Article 94(3) EPC dated Sep. 24, 2020 in counterpart EP Application No. 16873258.4.

* cited by examiner

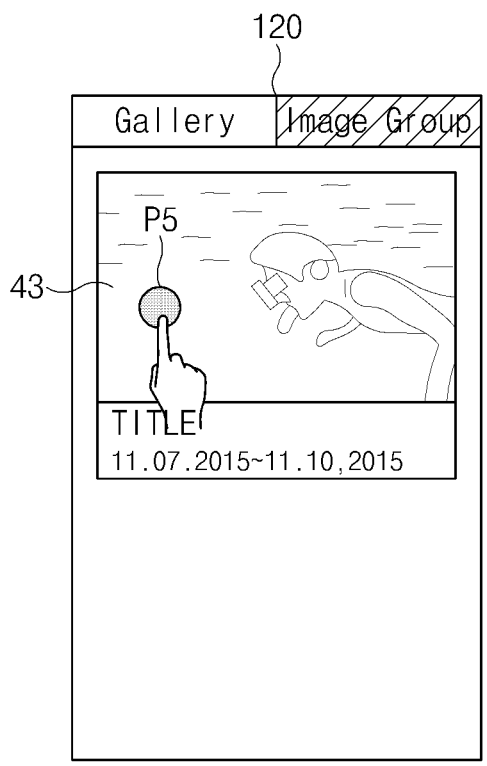
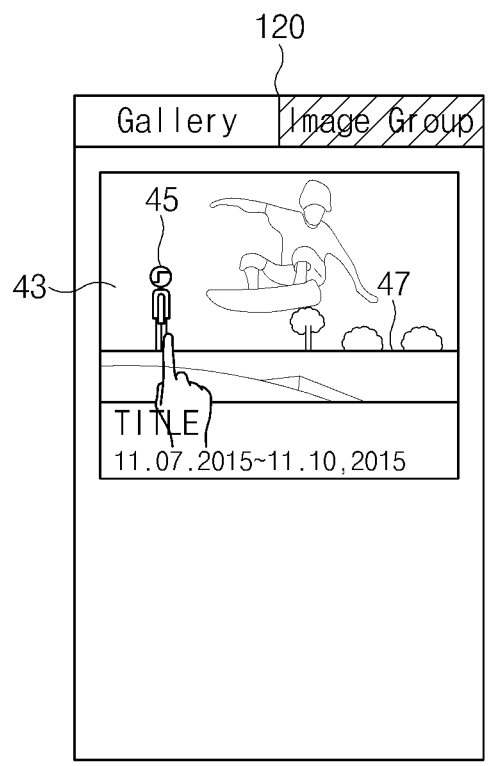
FIG.7A        FIG.7B
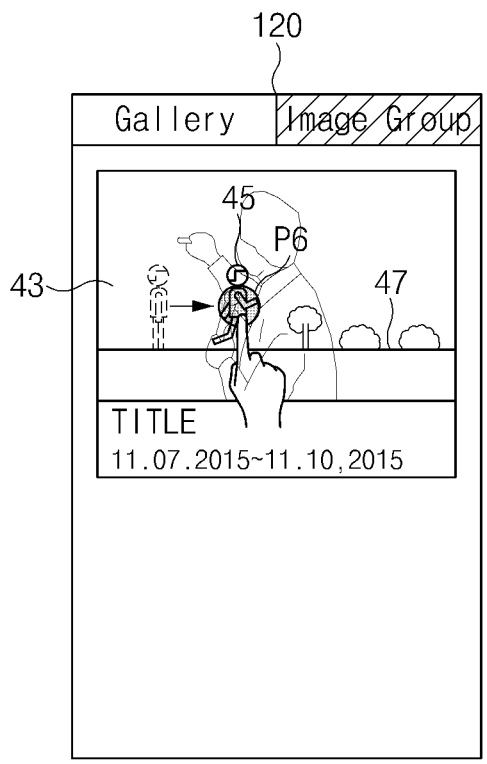
FIG.7C

ELECTRONIC DEVICE AND DISPLAY METHOD OF ELECTRONIC DEVICE

This application is the U.S. national phase of International Application No. PCT/KR2016/013496 filed 22 Nov. 2016, which designated the U.S. and claims priority to KR Patent Application No. 10-2015-0177220 filed 11 Dec. 2015, the entire contents of each of which are hereby incorporated by reference.

TECHNICAL FIELD

The present disclosure relates to a contents display method of an electronic device including a display.

DESCRIPTION OF RELATED ART

With the development of electronic technologies, various electronic devices have been developed. In recent years, portable electronic devices, such as smartphones, tablet PCs, and the like, have been widely used to provide various services, for example, photographing, listening to music, reproducing a video, an e-mail service, a social networking service (SNS), and the like.

Portable terminals, such as smartphones, tablet PCs, and the like, which have a camera mounted therein are usually used to take a photo in everyday life, and the number of photos stored in an electronic device are increasing with an increase in storage capacity.

In general, contents (e.g., photos, videos, files, and the like) may be stored in folders (or groups) in an electronic device. With a folder list displayed on a display, a user may identify only one piece of representative content (e.g., a representative image, a representative file name, a representative video thumbnail, or the like) included in a folder and has to enter the folder or group to identify contents stored therein (e.g., photos, videos, files, and the like).

Even when the user wants to browse through contents included in a specific folder, the user has to make an entrance to the specific folder. Also, to identify contents stored in another folder while the user views the contents stored in the specific folder, the user has to deviate from the specific folder and make an entrance to the other folder.

SUMMARY

An aspect of the present disclosure is to provide an electronic device for identifying contents included in a folder without entrance to the folder, and a display method thereof.

An electronic device according to various embodiments of the present disclosure includes a display, an input module that receives a user input, and a processor that creates an image group including a plurality of images according to a specified condition, displays a first object representing the image group on the display, and, when a user input is applied to the first object, displays a second object for browsing through the plurality of images included in the image group, in a location corresponding to a location where the user input is applied.

A display method of an electronic device according to various embodiments of the present disclosure includes creating an image group including a plurality of images according to a specified condition, displaying a first object representing the image group on a display, receiving a user input applied to the first object, and displaying a second object for browsing through the plurality of images included in the image group, in a location corresponding to a location where the user input is applied.

An electronic device according to various embodiments of the present disclosure includes a display, a memory that stores a plurality of images including a first image and a second image, and a processor. The processor displays, on the display, a first object corresponding to an image group including the first image and the second image, receives a user input applied to the first object, and differently displays, on the display, a location, a shape, or a size of a second object for browsing through the first image or the second image, depending on the user input.

According to various embodiments of the present disclosure, a user may rapidly identify contents stored in a folder even in the state in which a folder list is displayed, and therefore user convenience may be improved.

BRIEF DESCRIPTION OF THE DRAWINGS

FIG. 7A to 7C illustrate a user interface according to various embodiments of the present disclosure.

DETAILED DESCRIPTION OF EXAMPLE EMBODIMENT

Figure 1:
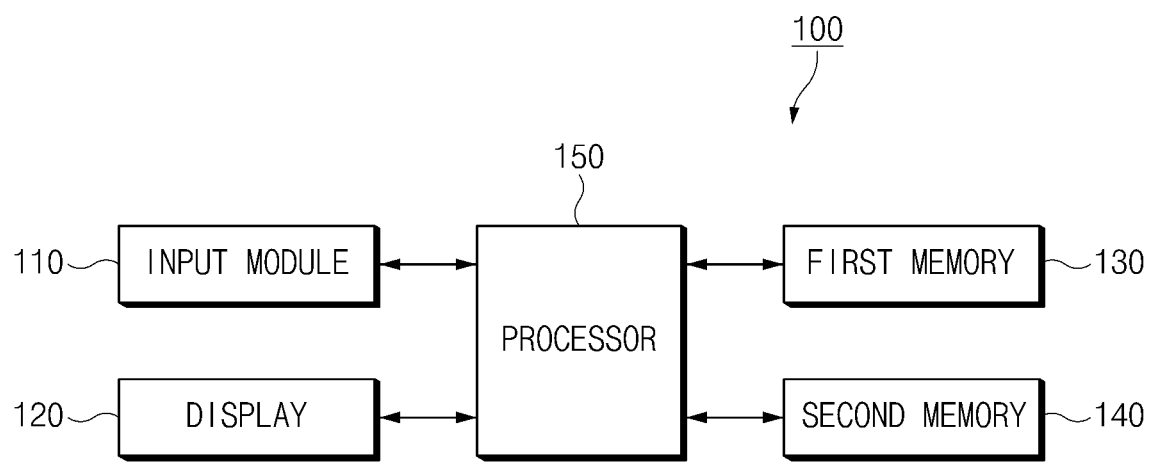
FIG. 1 is a block diagram illustrating a configuration of an electronic device according to various embodiments of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a block diagram illustrating a configuration of an electronic device according to various embodiments of the present disclosure.

Referring to FIG. 1, an electronic device 100 may include an input module 110, a display 120, a first memory 130, a second memory 140, and a processor 150.

According to an embodiment, the input module 110 may receive a user input. According to an embodiment, the input module 110 may receive a user input applied to a first object representing an image group displayed on the display 120.

According to an embodiment, the input module 110 may include a touch sensor panel that senses a user's touch operation or a pen sensor panel that senses the user's pen operation. According to an embodiment, the touch sensor panel may include a pressure sensor for detecting pressure of a user touch. The pressure sensor may be implemented integrally with the touch sensor panel, or may be implemented with one or more sensors separate from the touch sensor panel.

According to an embodiment, the display 120 may display a user interface. According to an embodiment, the display 120 may display the first object representing an image group stored in the first memory 130. According to an embodiment, when a user input is applied to the first object, the display 120 may display a second object in a location corresponding to the location where the user input is applied.

According to an embodiment, the first memory 130 may be a non-volatile memory. For example, the first memory 130 may include a flash memory. For example, the first memory 130 may include an embedded multimedia card (eMMC), universal flash storage (UFS), or a secure digital card (SD card).

According to an embodiment, the first memory 130 may store images (e.g., photos, videos, or cover images included in music files). According to an embodiment, the first memory 130 may store a plurality of images taken by a user or received from an external electronic device. According to an embodiment, the first memory 130 may store an image group created by the processor 150. The image group may include, for example, at least one (e.g., a plurality of) image(s).

According to an embodiment, the second memory 140 may be a volatile memory. For example, the second memory 140 may be a random access memory (RAM).

According to an embodiment, to improve a processing speed, the second memory 140 may temporarily store images to be displayed on the display 120. For example, the second memory 140 may read and store images stored in the first memory 130.

According to an embodiment, the processor 150 may control an overall operation of the electronic device 100. For example, the processor 150 may control the input module 110, the display 120, the first memory 130, and the second memory 140 to provide images to a user according to various embodiments of the present disclosure.

According to an embodiment, the processor 150 (e.g., an application processor) may be implemented with a system on chip (SoC) that includes at least one processor (or a central processing unit (CPU)), a graphic processing unit (GPU), a video processor, a memory, and the like.

According to an embodiment, the processor 150 may create an image group including one or more images. According to an embodiment, the processor 150 may create the image group according to a specified condition. For example, the processor 150 may select at least one image satisfying the specified condition from a plurality of images stored in the first memory 130 and may create an image group including the at least one selected image.

According to an embodiment, the processor 150 may create an image group, based on at least one of an image attribute (e.g., the time when an image was taken, the place where an image was taken, a shutter speed, an F-number, or the like), an image analysis result (e.g., a person included in an image, an animal included in an image, or the type of photographed subject), and a tag inserted in an image. For example, the processor 150 may create an image group including images taken at specified time or on a specified date. In another example, the processor 150 may create an image group including images taken in a specified place at specified time or on a specified date. In another example, the processor 150 may create an image group that includes images in which a specified person is included or images in which a specified number of persons are included. In another example, the processor 150 may create an image group including images in which a tag with a specified word or name is inserted.

According to an embodiment, the processor 150 may store the created image group in the first memory 130. According to an embodiment, the processor 150 may store attributes of the image group (e.g., a creation condition, the title, the number of images, the time when the images were taken, the places where the images were taken, and the like) together with the image group.

FIGS. 2A to 2D illustrate a user interface according to various embodiments of the present disclosure.

Figure 2A:
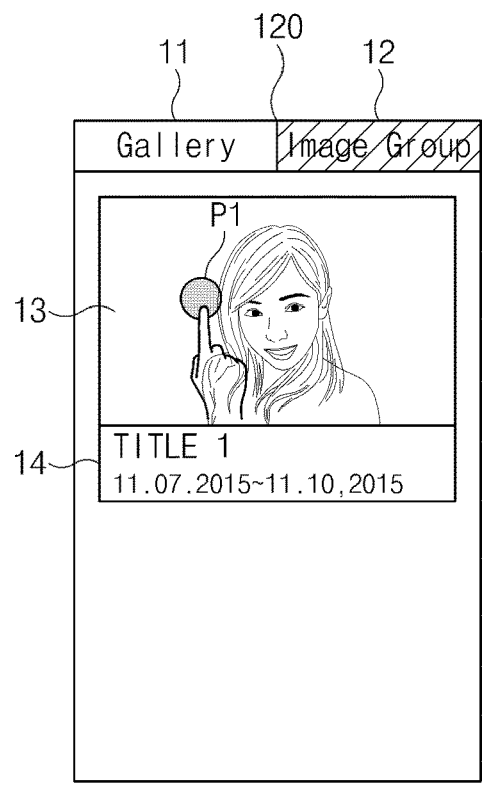
FIG. 2A to 2D illustrate a user interface according to various embodiments of the present disclosure.

According to an embodiment, the processor 150 may provide a service relating to an image group through the display 120. For example, a user interface illustrated in FIG. 2A may be displayed on the display 120 when a user executes an application (e.g., a gallery application). Referring to FIG. 2A, the user interface may include a gallery tab 11 and an image group tab 12. According to an embodiment, when the user selects the gallery tab 11, the processor 150 may display a user interface that is capable of providing images taken by the user or images received from an external electronic device. According to an embodiment, when the user selects the image group tab 12, the processor 150 may display a user interface that is capable of providing images included in an image group.

Referring to FIG. 2A, the processor 150 may display, on the display 120, a first object (or an indicator) 13 representing an image group when the image group tab 12 is selected by the user. For example, the first object 13 may be one (e.g., a representative image) of a plurality of images included in the image group. According to an embodiment, in response to a user input, the first object 13 may be magnified or reduced in the region where the first object 13 is displayed. According to an embodiment, the processor 150 may display image group information 14 together with the first object 13. The image group information 14 may include, for example, the title of the image group, the time when the image included in the image group was taken, and the like.

According to an embodiment, the processor 150 may receive a user input applied to the first object 13. For example, when a user input is applied to the region where the first object 13 is displayed, the processor 150 may determine that the user input is applied to the first object 13. Referring to FIG. 2A, when the user input is applied to the first object 13, the processor 150 may determine the location where the user input is applied. For example, the processor 150 may determine that the user input is applied to a first location P1 in the region where the first object 13 is displayed.

Figure 2B:
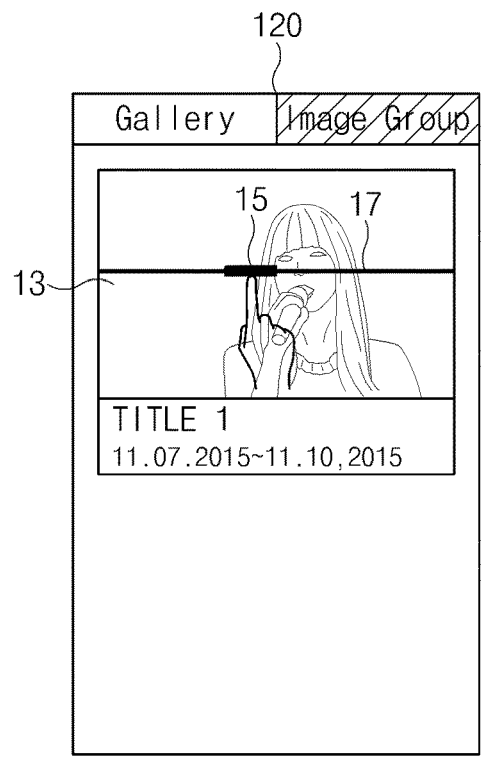

Referring to FIG. 2B, when the user input is applied to the first object 13, the processor 150 may display, in a location (or region) corresponding to the location (e.g., P1 of FIG. 2A) where the user input is applied, a second object (or a handler) 15 for browsing through the plurality of images included in the image group. According to an embodiment, the processor 150 may display a third object (or a guide bar)

17, which represents a path along which the second object 15 moves, together with the second object 15.

According to an embodiment, the processor 150 may display the second object 15 in consideration of the abscissa (or x-coordinate) and the ordinate (or y-coordinate) of the user input. For example, the processor 150 may display the second object 15 in the same location as the abscissa and ordinate of the location where the user input is applied. According to an embodiment, the processor 150 may display the second object 15 in consideration of only the abscissa of the user input without regard to the ordinate of the user input. For example, the processor 150 may display the second object 15 by using the abscissa of the location where the user input is applied and a specified vertical coordinate.

According to an embodiment, when the user input is applied to the first object 13, the processor 150 may display, in the region corresponding to the first object 13 (or the region where the first object 13 is displayed), an image corresponding to the location of the second object 15 (or the location where the user input is applied), among the plurality of images included in the image group. For example, referring to FIG. 2B, the first object 13 may be changed from the representative image (e.g., a first image) to an image (e.g., a second image) corresponding to the first location P1.

According to an embodiment, when the user input is applied to the first object 13, the processor 150 may determine the type of user input. According to an embodiment, the processor 150 may display the second object 15 when a specified type of user input is applied. For example, when a swipe or a flick is input, the processor 150 may display the second object 15, and when a tap is input, the processor 150 may display a separate user interface in which one or more images included in the image group are arranged, without displaying the second object 15.

According to an embodiment, when the user input is applied to the first object 13, the processor 150 may determine whether a plurality of images is included in the image group corresponding to the first object 13 to which the user input is applied. In the case where only one image is included in the image group, the processor 150 may display a separate user interface that provides the image included in the image group, without displaying the second object 15.

Figure 2C:
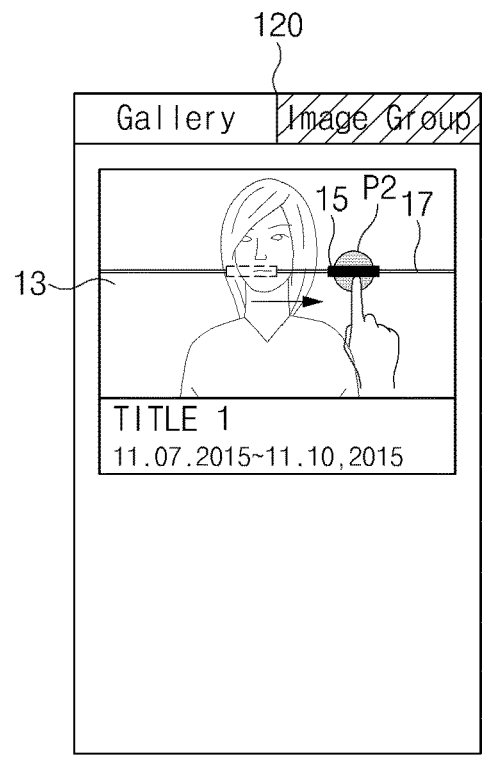

Referring to FIG. 2C, the location where the user input is applied may be changed. For example, the location of the user input may be changed from the first location P1 to a second location P2. According to an embodiment, when the location of the user input is changed, the processor 150 may change the location of the second object 15, depending on the changed location P2 of the user input. For example, the location of the second object 15 may be changed from the first location P1 to the second location P2.

According to an embodiment, the processor 150 may set a location change unit for the second object 15, depending on the number of images included in the image group that corresponds to the first object 13 to which the user input is applied. For example, in the case where the region where the first object 13 is displayed has 1000 horizontal pixels and the image group corresponding to the first object 13 has 10 images, the processor 150 may set the location change unit for the second object 15 to 100 pixels.

According to an embodiment, the second object 15 may be moved based on the location change unit. For example, the processor 150 may change the location of the second object 15 when the location of the user input is changed by a specified magnitude (e.g., the location change unit).

According to an embodiment, the processor 150 may differently set the size (e.g., the horizontal length) of the second object 15, depending on the number of images included in the image group that corresponds to the first object 13 to which the user input is applied. For example, the processor 150 may reduce the size of the second object 15 with an increase in the number of images included in the image group.

According to an embodiment, when the location of the user input is changed, the processor 150 may display, in the region corresponding to the first object 13, an image corresponding to the changed location of the second object 15 (or the location where the user input is applied), among the plurality of images included in the image group. For example, referring to FIG. 2C, the first object 13 may be changed from the image (e.g., the second image) corresponding to the first location P1 to an image (e.g., a third image) corresponding to the second location P2.

Figure 2D:
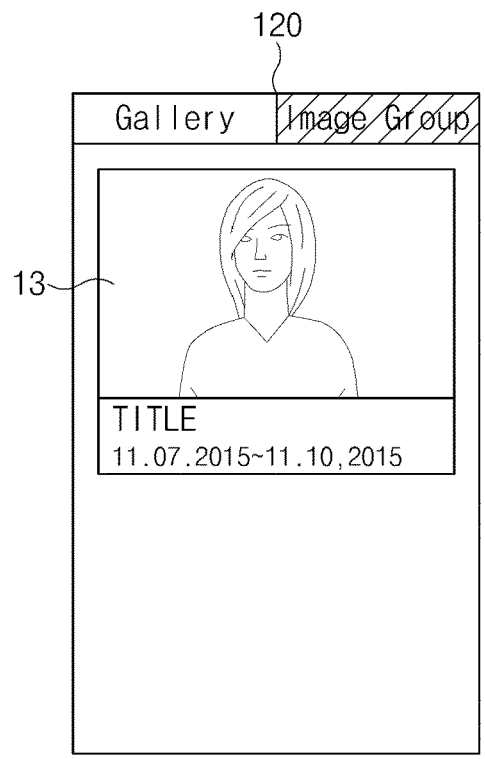

Referring to FIG. 2D, the user input may be completed. For example, a touch-up event may occur after the location of the user input is changed to the second location P2. According to an embodiment, the processor 150 may make the second object 15 and the third object 17 on the display 120 disappear when the user input is completed (or when a touch-up event occurs). According to an embodiment, even though the user input is completed, the processor 150 may continue to display the image (e.g., the third image) displayed in the region corresponding to the first object 13 right before the completion of the user input.

FIGS. 3A to 3D illustrate a user interface according to various embodiments of the present disclosure.

Figure 3A:
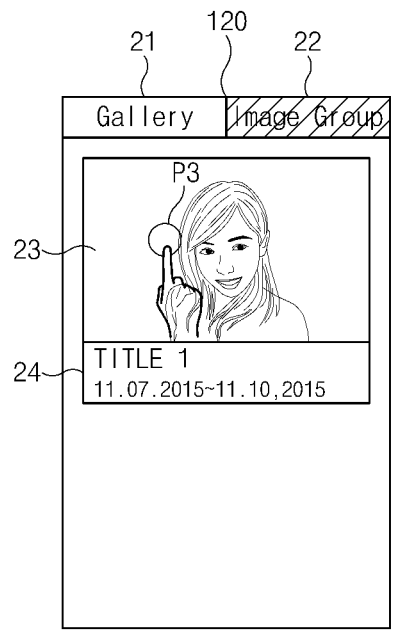
FIG. 3A to 3D illustrate a user interface according to various embodiments of the present disclosure.

According to an embodiment, the processor 150 may provide a service relating to an image group through the display 120. For example, a user interface illustrated in FIG. 3A may be displayed on the display 120 when a user executes an application (e.g., a gallery application). Referring to FIG. 3A, the user interface may include a gallery tab 21 and an image group tab 22. The processor 150 may display, on the display 120, a first object 23 representing an image group when the image group tab 22 is selected by the user. For example, the first object 23 may be one (e.g., a representative image) of a plurality of images included in the image group. According to an embodiment, the processor 150 may display image group information 24 together with the first object 23. The image group information 24 may include, for example, the title of the image group, the time when the image included in the image group was taken, and the like.

According to an embodiment, the processor 150 may receive a user input applied to the first object 23. For example, when a user input is applied to the region where the first object 23 is displayed, the processor 150 may determine that the user input is applied to the first object 23. According to an embodiment, when the user input is applied to the first object 23, the processor 150 may determine the location where the user input is applied. For example, the processor 150 may determine that the user input is applied to a third location P3 in the region where the first object 23 is displayed.

Figure 3B:
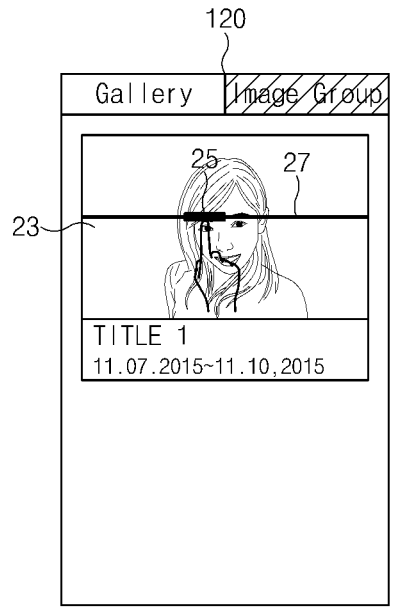

Referring to FIG. 3B, when the user input is applied to the first object 23, the processor 150 may display, in a location (or region) corresponding to the location (e.g., P3 of FIG. 3A) where the user input is applied, a second object 25 for browsing through the plurality of images included in the image group. According to an embodiment, the processor 150 may display a third object 27, which represents a path along which the second object 25 moves, together with the second object 25.

Figure 3C:
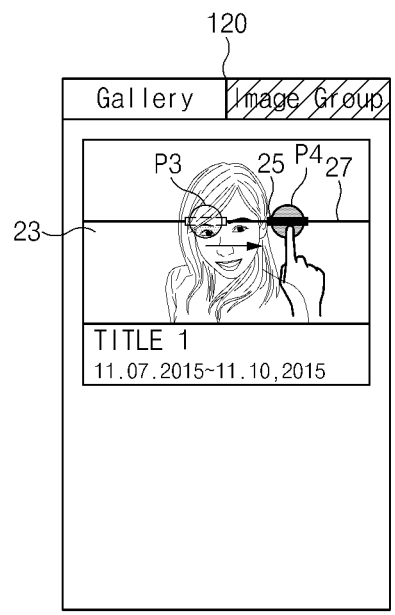

Referring to FIG. 3C, the location where the user input is applied may be changed. For example, the location of the user input may be changed from the third location P3 to a fourth location P4. According to an embodiment, when the location of the user input is changed, the processor 150 may change the location of the second object 25, depending on the changed location P4 of the user input. For example, the location of the second object 25 may be changed from the third location P3 to the fourth location P4.

Figure 3D:
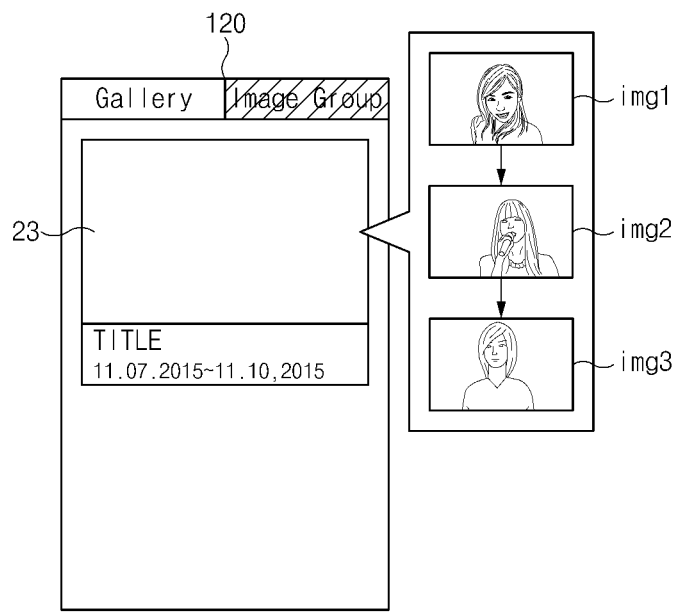

Referring to FIG. 3D, the user input may be completed. For example, a touch-up event may occur after the location of the user input is changed to the fourth location P4. According to an embodiment, the processor 150 may make the second object 25 and the third object 27 on the display 120 disappear when the user input is completed (or when a touch-up event occurs).

According to an embodiment, when the user input is completed, the processor 150 may display, in the region corresponding to the first object 23, an image corresponding to the user input. For example, when the user input is completed, the processor 150 may determine the start point (e.g., the third location P3) and the end point (e.g., the fourth location P4) of the user input. The processor 150 may sequentially display images between the image corresponding to the third location P3 and the image corresponding to the fourth location P4. For example, referring to FIG. 3D, the first object 23 may be sequentially changed from the representative image (e.g., a first image img1) to the image (e.g., a second image img2) corresponding to the third location P3 and the image (e.g., a third image img3) corresponding to the fourth location P4.

Figure 4:
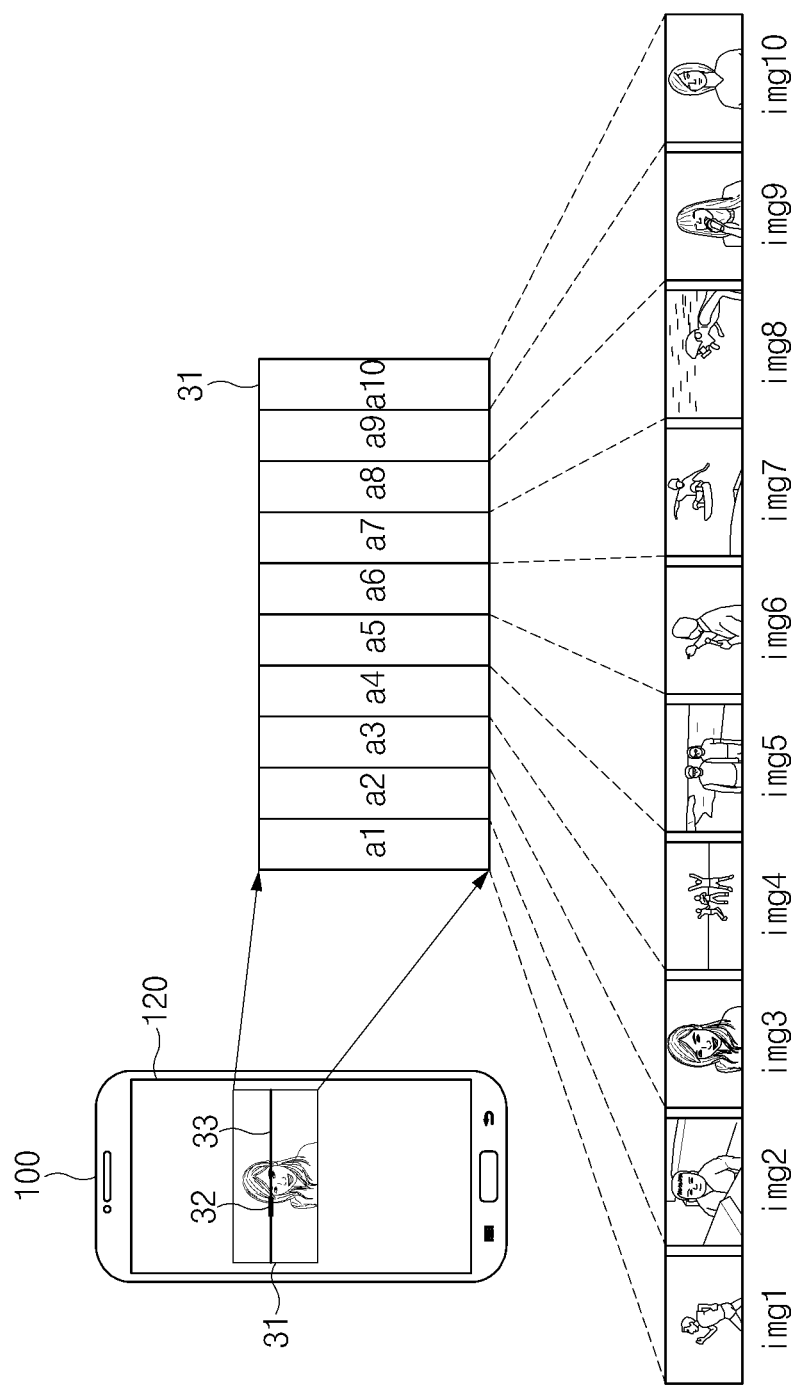
FIG. 4 illustrates a process of determining an image corresponding to the location of a user input, according to various embodiments of the present disclosure.

FIG. 4 illustrates a process of determining an image corresponding to the location of a user input, according to various embodiments of the present disclosure.

Referring to FIG. 4, the electronic device 100 (e.g., the processor 150) may display, on the display 120, a first object 31 representing an image group. According to an embodiment, the processor 150 may display a second object 32 and a third object 33 on the display 120 when a user input is applied to the first object 31. According to an embodiment, the processor 150 may divide the region where the first object 31 is displayed into a plurality of sections that correspond to the number of images included in an image combination file. The image group may include, for example, ten images img1 to img10. For example, referring to FIG. 4, the processor 150 may divide the region where the first object 31 is displayed into ten sections a1 to a10 with respect to a horizontal axis. Each of the sections may correspond to one of the plurality of images included in the image group.

According to an embodiment, the processor 150 may determine a section that corresponds to the location of the second object 32 or the location where the user input is applied, and may identify an image corresponding to the determined section. For example, referring to FIG. 4, when the second object 32 is located in the third section a3, the third image img3 corresponding to the third section a3 may be displayed as the first object 31.

Figure 5:
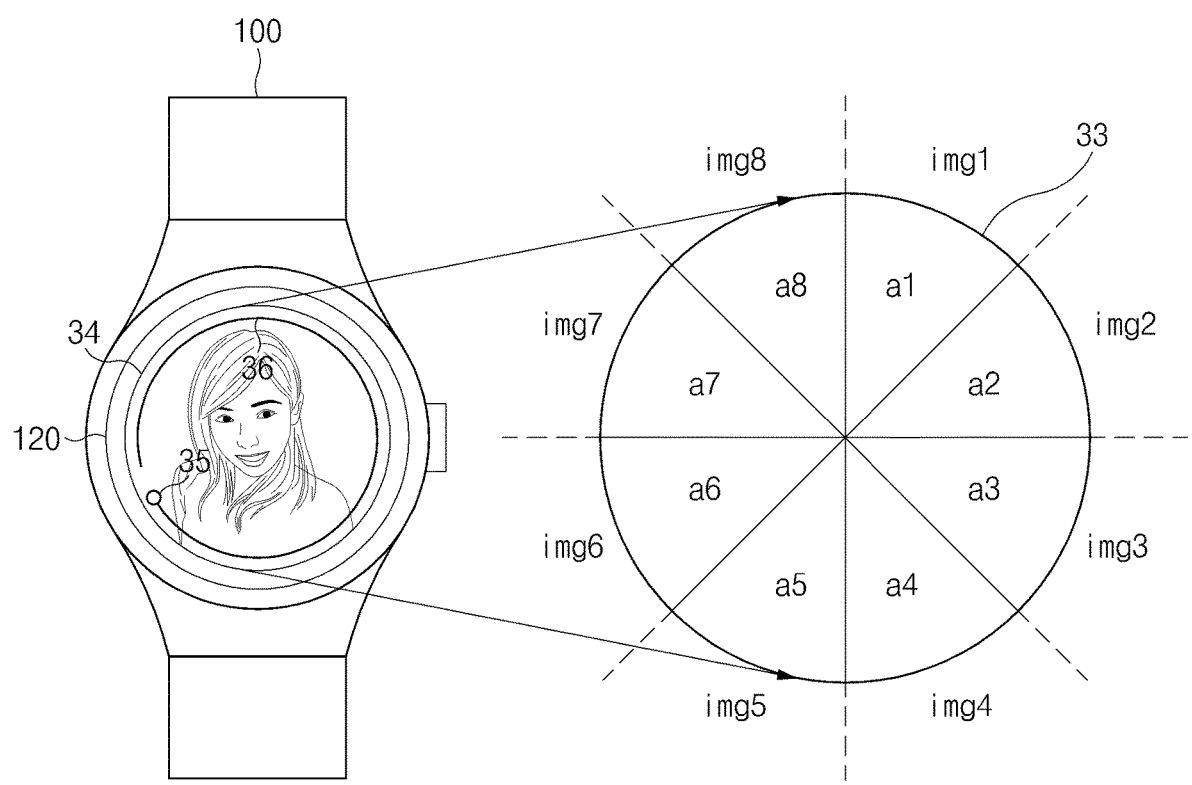
FIG. 5 illustrates a process of determining an image corresponding to the location of a user input, according to various embodiments of the present disclosure.

FIG. 5 illustrates a process of determining an image corresponding to the location of a user input, according to various embodiments of the present disclosure.

Referring to FIG. 5, the electronic device 100 (e.g., the processor 150) may display, on the display 120, a first object 34 representing an image group. According to an embodiment, the electronic device 100 may be a smartwatch. According to an embodiment, the electronic device 100 may include the circular display 120, and the first object 34 may have a circular shape. According to an embodiment, the processor 150 may display a second object 35 and a third object 36 on the display 120 when a user input is applied to the first object 34.

According to an embodiment, the processor 150 may divide the region where the first object 34 is displayed into a plurality of sections that correspond to the number of images included in an image combination file. The image group may include, for example, eight images img1 to img8. For example, referring to FIG. 5, the processor 150 may divide the region where the first object 34 is displayed into eight sections a1 to a8 in a circumferential direction with respect to the center of the region where the first object 34 is displayed. Each of the sections may correspond to one of the plurality of images included in the image group.

According to an embodiment, the processor 150 may determine a section that corresponds to the location of the second object 35 or the location where the user input is applied, and may identify an image corresponding to the determined section. For example, referring to FIG. 5, when the second object 35 is located in the sixth section a6, the sixth image img6 corresponding to the sixth section a6 may be displayed as the first object 34.

According to an embodiment, depending on the shape of the display 120 (or the shape of the first object 34), the processor 150 may differently display at least one of the location, shape, and size of the second object 35 or the third object 36. For example, referring to FIG. 4, in the case where the first object 31 has a rectangular shape, the second object 32 may be displayed in a rectangular shape, and the third object 33 may be displayed in a straight line. In another example, referring to FIG. 5, in the case where the first object 34 has a circular shape, the second object 35 may be displayed in a circular (or oval) shape, and the third object 36 may be displayed in a circular (or curved) line.

According to an embodiment, the processor 150 may copy images stored in the first memory 130 to the second memory 140 to display at least one image included in the image group on the display 120. According to an embodiment, the first memory 130 may store a plurality of image groups. In the case where all the image groups stored in the first memory 130 are copied to the second memory 140, the storage space of the second memory 140 may be wasted and the performance of the electronic device 100 may be degraded. Accordingly, the processor 150 may copy, to the second memory 140, only some of the plurality of image groups stored in the first memory 130.

According to an embodiment, the processor 150 may display a list of the image groups stored in the first memory 130 when a user selects an image group tab of a gallery application (e.g., the image group tab 12 of FIG. 2A). The user may browse through the image groups stored in the first memory 130, for example, by scrolling the list. According to an embodiment, the processor 150 may copy, to the second memory 140, only an image group displayed on the display 120 while scrolling is stopped (or only the image group corresponding to the first object 34 displayed on the display 120). According to an embodiment, the processor 150 may copy, to the second memory 140, only an image group displayed on the display 120 in the state in which a scroll speed is lower than or equal to a specified value (or only the image group corresponding to the first object 34 displayed on the display 120). The processor 150 may selectively copy, to the second memory 140, only an image group to which a user input is more likely to be applied, and therefore it is possible to ensure a storage space of the second memory 140 and to improve the performance of the electronic device 100.

According to an embodiment, the processor 150 may sequentially copy a plurality of images included in an image group to the second memory 140. The plurality of images included in the image group may be arranged, for example, according to a specified condition (e.g., the sizes of the images, the time when the images were taken, or the like). According to an embodiment, the processor 150 may sequentially copy the plurality of images included in the image group to the second memory 140 in the order in which the plurality of images are arranged. According to an embodiment, the processor 150 may copy, to the second memory 140, images corresponding to a location change unit of the second object 35, among the plurality of images included in the image group. The processor 150 may sequentially copy the plurality of images included in the image group to the second memory 140, for example, by gradually decreasing the location change unit of the second object 35. A specific description thereabout will be given with reference to FIG. 6.

Figure 6:
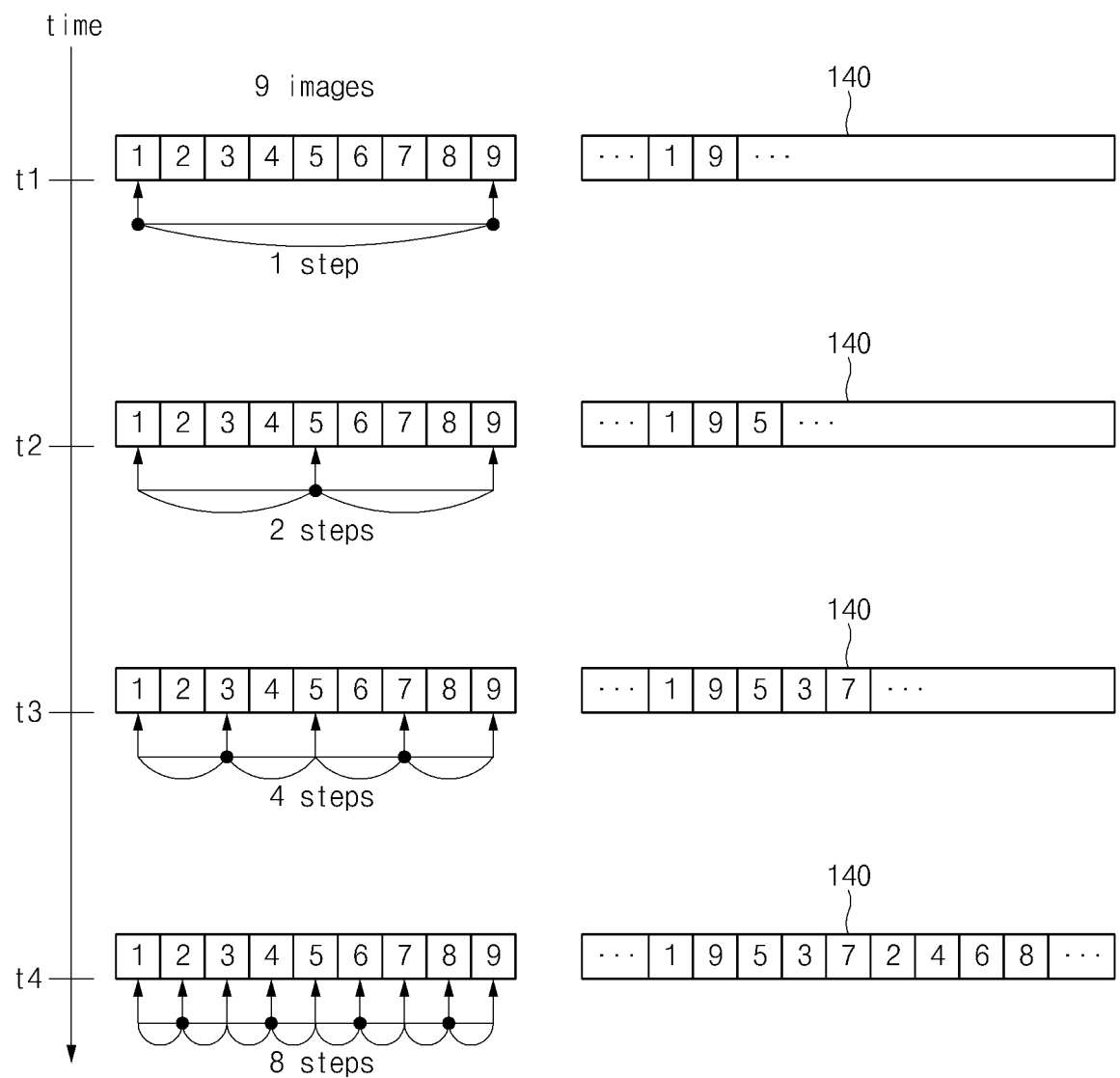
FIG. 6 illustrates images copied to a second memory, according to various embodiments of the present disclosure.

FIG. 6 illustrates images copied to the second memory, according to various embodiments of the present disclosure.

Referring to FIG. 6, the processor 150 may sequentially copy a plurality of images included in an image group to the second memory 140 as time passes. The image group may include, for example, nine images.

According to an embodiment, the processor 150 may set a location change unit such that the location of a second object is changed in a single stage at first time t1. Accordingly, the second object may be moved in the region corresponding to the first and ninth images. The processor 150 may copy, to the second memory 140, the first and ninth images corresponding to the set location change unit.

According to an embodiment, the processor 150 may set the location change unit such that the location of the second object is changed in two stages at second time t2. Accordingly, the second object may be moved in the region corresponding to the first, fifth, and ninth images. The processor 150 may copy the fifth image to the second memory 140, except the first and ninth images stored in advance in the second memory 140, among the first, fifth, and ninth images corresponding to the set location change unit.

According to an embodiment, the processor 150 may set the location change unit such that the location of the second object is changed in four stages at third time t3. Accordingly, the second object may be moved in the region corresponding to the first, third, fifth, seventh, and ninth images. The processor 150 may copy the third and seventh images to the second memory 140, except the images stored in advance in the second memory 140, among the first, third, fifth, seventh, and ninth images corresponding to the set location change unit.

According to an embodiment, the processor 150 may set the location change unit such that the location of the second object is changed in eight stages at fourth time t4. Accordingly, the second object may be moved in the region corresponding to the first to ninth images. The processor 150 may copy the second, fourth, sixth, and eighth images to the second memory 140, except the images stored in advance in the second memory 140, among the first to ninth images corresponding to the set location change unit.

FIGS. 7A to 7C illustrate a user interface according to various embodiments of the present disclosure.

Referring to FIG. 7A, the processor 150 may display, on the display 120, a first object 43 representing an image group. For example, the first object 43 may be one (e.g., a representative image) of a plurality of images included in the image group. According to an embodiment, the processor 150 may receive a user input applied to the first object 43. When the user input is applied to the first object 43, the processor 150 may determine the location where the user input is applied. For example, the processor 150 may determine that the user input is applied to a fifth location P5 in the region where the first object 43 is displayed.

Referring to FIG. 7B, when the user input is applied to the first object 43, the processor 150 may display, in a location (or region) corresponding to the location (e.g., P5 of FIG. 7A) where the user input is applied, a second object 45 for browsing through the plurality of images included in the image group. According to an embodiment, the processor 150 may display a third object 47, which represents a path along which the second object 45 moves, together with the second object 45.

According to an embodiment, the processor 150 may differently display at least one of the shape and size of the second object 45 (or the third object 47), depending on attributes (e.g., a creation condition) of the image group corresponding to the first object 43 to which the user input is applied. For example, referring to FIG. 7B, in the case where the image group is related to people, the processor 150 may display the second object 45 in the shape of a person and the third object 47 in the shape of a flat land including a tree, a bush, or the like. In another example, in the case where the image group is related to animals, the processor 150 may display the second object 45 in the shape of an animal. In another example, in the case where the image group is related to a specified place (e.g., Paris), the processor 150 may display the second object 45 in the shape of a landmark (e.g., the Eiffel Tower) that represents the corresponding place. In another example, in the case where the image group is related to a specific person, the processor 150 may display the specific person's facial picture as the second object 45.

Referring to FIG. 7C, the location where the user input is applied may be changed. For example, the location of the user input may be changed from the fifth location P5 to a sixth location P6. According to an embodiment, when the location of the user input is changed, the processor 150 may change at least one of the location, shape, and size of the second object 45 (or the third object 47), depending on the changed location P6 of the user input. For example, the location of the second object 45 may be changed from the fifth location P5 to the sixth location P6, and the shape of the second object 45 may be changed from the shape of a person who stands to the shape of a person who walks.

According to an embodiment, the processor 150 may provide an animation effect to a user by continuously changing at least one of the location, shape, and size of the second object 45 in response to a change in the location of the user input. For example, the processor 150 may provide an animation effect in which the second object 45 having the shape of a person walks on the third object 47 having the shape of a flat land. In another example, the processor 150 may provide an animation effect in which the second object 45 having the shape of an animal runs on the third object 47 having the shape of a hill. In another example, the processor 150 may provide an animation effect in which the second object 45 having the shape of the sun makes an arc and changes in size (e.g., gradually increases toward the center and decreases toward a side) as the second object 45 moves over the third object 47 having the shape of the horizon or the surface of the sea.

Figure 8A:
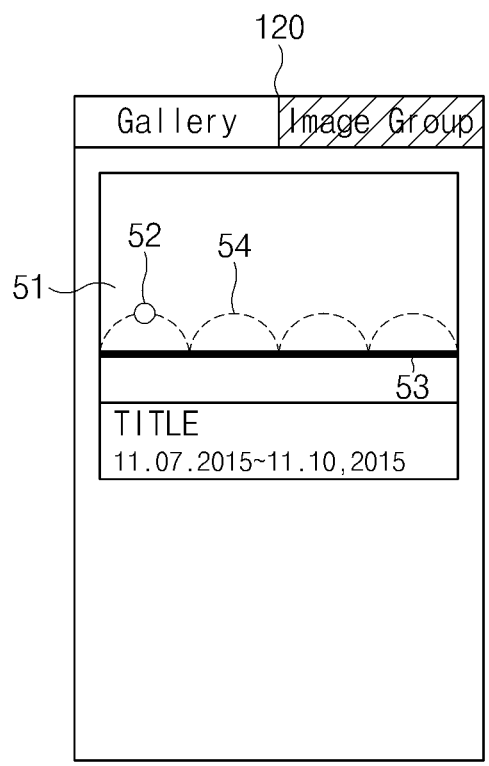
FIG. 8A to 8B illustrate a travel path of a second object according to various embodiments of the present disclosure.
Figure 8B:
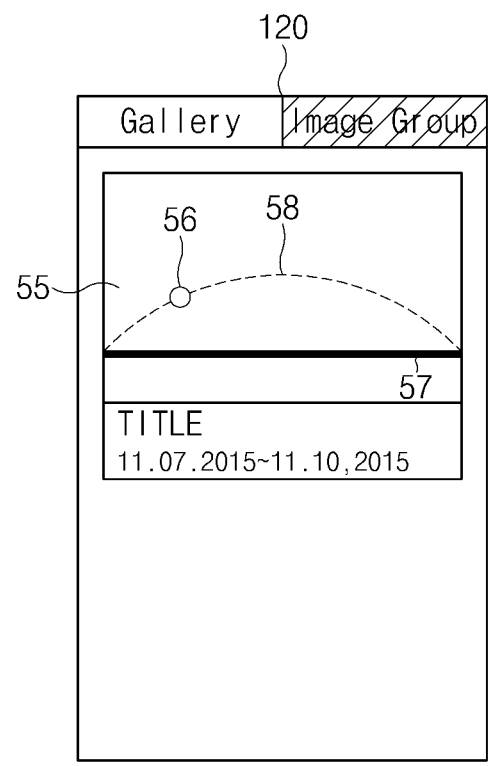

FIGS. 8A and 8B illustrate travel paths of a second object, according to various embodiments of the present disclosure.

In the above-described embodiments, the second objects have been described as moving along the third objects. However, the second objects may move along paths different from the third objects.

Referring to FIG. 8A, the processor 150 may display, on the display 120, a first object 51 representing an image group. According to an embodiment, when a user input is applied to the first object 51, the processor 150 may display, in a location (or region) corresponding to the location where the user input is applied, a second object 52 for browsing through a plurality of images included in the image group and a third object 53. According to an embodiment, the second object 52 may move along a path 54 different from the third object 53. For example, the processor 150 may move the second object 52 along the path 54 different from the third object 53 to provide an animation effect in which the second object 52 having the shape of an animal runs on the third object 53 having the shape of a lawn.

Referring to FIG. 8B, the processor 150 may display, on the display 120, a first object 55 representing an image group. According to an embodiment, when a user input is applied to the first object 55, the processor 150 may display, in a location (or region) corresponding to the location where the user input is applied, a second object 56 for browsing through a plurality of images included in the image group and a third object 57. According to an embodiment, the second object 56 may move along a path 58 different from the third object 57. For example, the processor 150 may move the second object 56 along the path 58 different from the third object 57 to provide an animation effect in which the second object 56 having the shape of the sun makes an arc while moving over the third object 57 having the shape of the horizon or the surface of the sea.

Figure 9A:
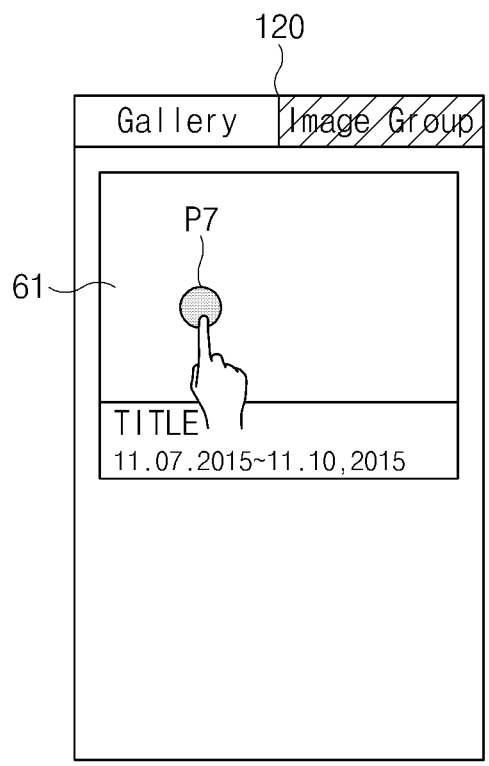
FIG. 9A to 9C illustrate a first object according to various embodiments of the present disclosure.
Figure 9B:
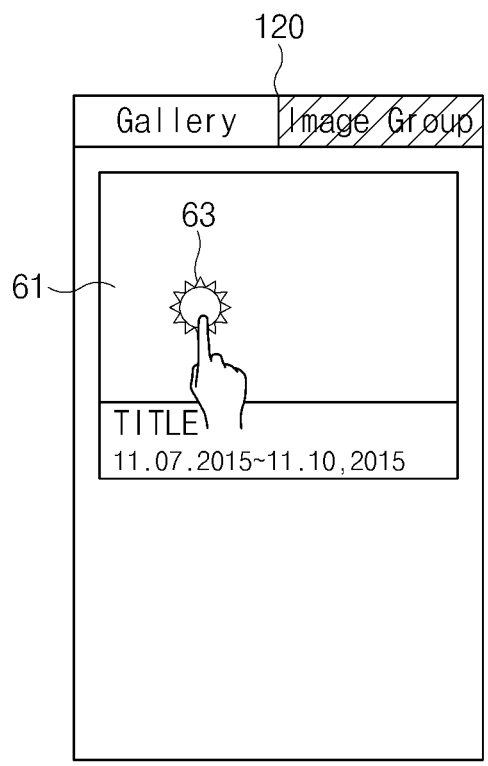
Figure 9C:
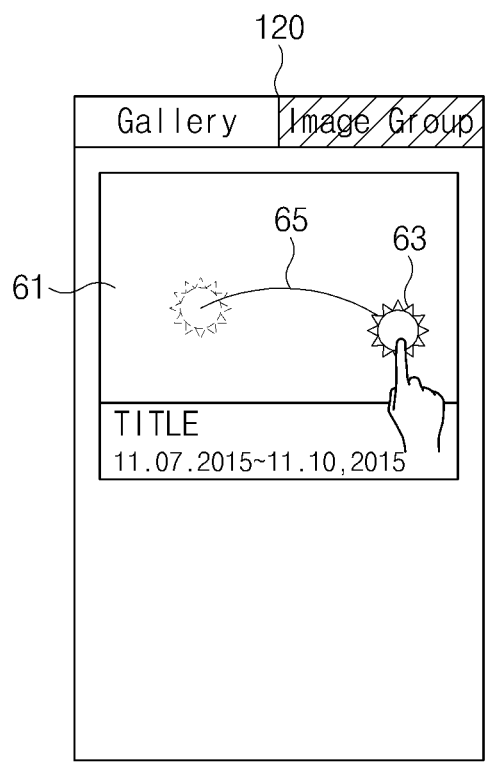

FIGS. 9A to 9C illustrate a user interface according to various embodiments of the present disclosure.

Referring to FIG. 9A, the processor 150 may display, on the display 120, a first object 61 representing an image group. According to an embodiment, the processor 150 may receive a user input applied to the first object 61. When the user input is applied to the first object 61, the processor 150 may determine the location where the user input is applied. For example, the processor 150 may determine that the user input is applied to a seventh location P7 in the region where the first object 61 is displayed.

Referring to FIG. 9B, when the user input is applied to the first object 61, the processor 150 may display, in a location (or region) corresponding to the location (e.g., P7 of FIG. 9A) where the user input is applied, a second object 63 for browsing through a plurality of images included in the image group.

Referring to FIG. 9C, the location where the user input is applied may be changed. According to an embodiment, when the location of the user input is changed, the processor 150 may change the location of the second object 63, depending on the changed location of the user input. According to an embodiment, when the location of the second object 63 is changed, the processor 150 may display a third object 65 corresponding to the path along which the second object 63 is moved.

Referring to FIG. 9C, when the location of the second object 63 is changed, the processor 150 may display a third object 65 corresponding to the path along which the second object 63 is moved. When the third object 65 is displayed, the second object 63 is moved according to the third object 65 until the user input is completed.

Figure 10A:
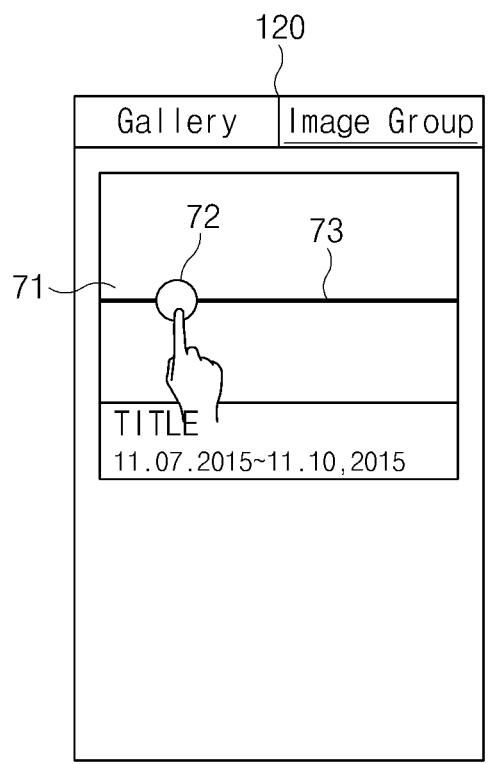
FIG. 10A to 10B illustrate a user interface according to various embodiments of the present disclosure.
Figure 10B:
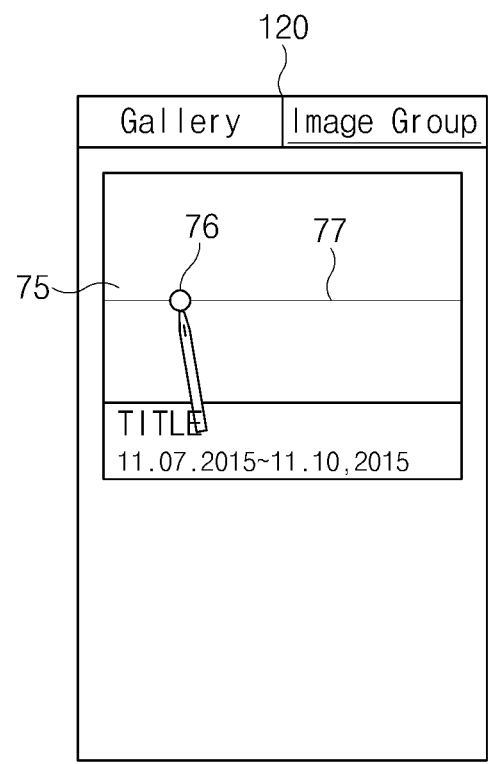

FIGS. 10A and 10B illustrate a user interface according to various embodiments of the present disclosure.

According to an embodiment, the processor 150 may differently display at least one of the shape and size of a second object (or a third object), depending on the area of a user input. For example, the processor 150 may increase the size of the second object with an increase in the area of the user input to the first object and may reduce the size of the second object with a decrease in the area of the user input to the first object.

Referring to FIG. 10A, a user may input a touch operation to a first object 71 by using a finger. According to an embodiment, when the user input is applied to the first object 71, the processor 150 may determine an area (e.g., a first area) touched by the user's finger. According to an embodiment, the processor 150 may display a second object 72 (or a third object 73) in a first size (or a first thickness) corresponding to the area by which the touch operation is input to the first object 71. According to an embodiment, the size of the second object 72 (or the third object 73) may be changed when the area of the touch operation is varied depending on the user input.

Referring to FIG. 10B, a user may input a pen operation to a first object 75 by using a pen. According to an embodiment, when the user input is applied to the first object 75, the processor 150 may determine an area (e.g., a second area) by which the pen operation is input to the first object 75. According to an embodiment, the processor 150 may display a second object 76 (or a third object 77) in a second size (or a second thickness) corresponding to the area by which the pen operation is input to the first object 75. According to an embodiment, the size of the second object 76 (or the third object 77) may be changed when the area of the pen operation is varied depending on the user input.

According to an embodiment, when a user input is applied to the first object, the processor 150 may display, in the region corresponding to the first object, a plurality of images included in an image group (e.g., all images included in the image group) that corresponds to the first object to which the user input is applied, depending on the direction in which the user input is applied. For example, when a horizontal user input is applied to the first object, the processor 150 may arrange and display the plurality of images, which are included in the image group, in the horizontal direction. In another example, when a vertical user input is applied to the first object, the processor 150 may arrange and display the plurality of images, which are included in the image group, in the vertical direction.

According to an embodiment, when arranging and displaying the plurality of images included in the image group, the processor 150 may display some of the plurality of images in a shape or size that is different from that of the remaining images. For example, the processor 150 may make an image corresponding to the location of the user input appear larger and may make the remaining images appear smaller. In another example, the processor 150 may display the image corresponding to the location of the user input on a plane (or in parallel to the display screen) and may display the remaining images at a different angle.

According to an embodiment, when arranging and displaying the plurality of images included in the image group, the processor 150 may display the images in such a manner that the images overlap one another. According to an embodiment, the processor 150 may display, in the foremost location, the image corresponding to the location of the user input and may display the remaining images behind the image corresponding to the location of the user input.

According to the embodiments described with reference to FIGS. 1 to 10B, the electronic device 100 may create image groups and may display an image corresponding to a user input on a display screen on which a list of image groups is displayed. According to various embodiments, the present disclosure may be applied not only to an image but also to different contents (e.g., music, a video, a file, or the like). For example, the electronic device 100 may create music (or video) groups including at least one piece of music (or at least one video) and may reproduce music (or a video) that corresponds to a user input on the display screen on which a list of music groups is displayed.

Figure 11:
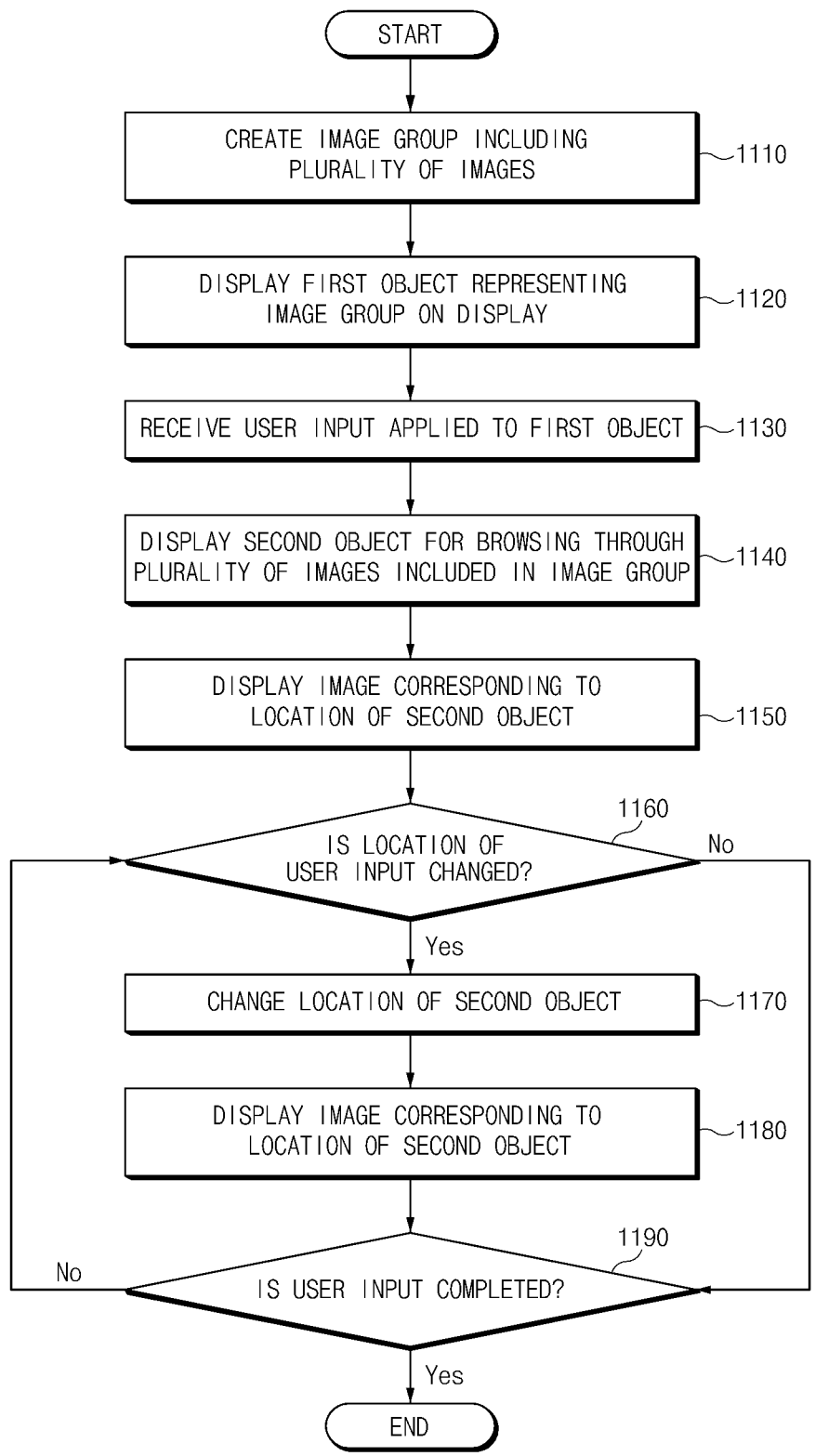
FIG. 11 is a flowchart illustrating a display method of an electronic device according to various embodiments of the present disclosure.

FIG. 11 is a flowchart illustrating a display method of an electronic device according to various embodiments of the present disclosure.

The flowchart illustrated in FIG. 11 may be configured with operations processed in the electronic device 100 illustrated in FIG. 1. Accordingly, although omitted in the following description, the contents set forth in relation to the electronic device 100 with reference to FIGS. 1 to 10 may also be applied to the flowchart illustrated in FIG. 11.

According to an embodiment, in operation 1110, the electronic device 100 (e.g., the processor 150) may create an image group including a plurality of images. According to an embodiment, the electronic device 100 may create the image group according to a specified condition. For example, the electronic device 100 may select at least one image satisfying the specified condition from a plurality of images stored in the first memory 130 and may create an image group including the at least one selected image. According to an embodiment, the electronic device 100 may store the created image group in the first memory 130.

According to an embodiment, in operation 1120, the electronic device 100 (e.g., the processor 150) may display, on the display 120, a first object (or an indicator) representing the image group. For example, the first object may be, for example, one (e.g., a representative image) of the plurality of images included in the image group.

According to an embodiment, in operation 1130, the electronic device 100 (e.g., the input module 110) may receive a user input applied to the first object. According to an embodiment, when the user input is applied to the region where the first object is displayed, the electronic device 100 (e.g., the processor 150) may determine that the user input is applied to the first object.

According to an embodiment, in operation 1140, the electronic device 100 (e.g., the processor 150) may display, on the display 120, a second object (or a handler) for browsing through the plurality of images included in the image group. According to an embodiment, the electronic device 100 may display the second object in a location (or a region) corresponding to the location where the user input is applied. According to an embodiment, the electronic device 100 may display a third object (or a guide bar), which represents a path along which the second object moves, together with the second object.

According to an embodiment, the electronic device 100 may differently display at least one of the shape and size of the second object (or the third object), depending on attributes (e.g., a creation condition, the number of images, and the like) of the image group corresponding to the first object to which the user input is applied.

According to an embodiment, the electronic device 100 may differently display at least one of the shape and size of the second object (or the third object), depending on the area of the user input.

According to an embodiment, in operation 1150, the electronic device 100 (e.g., the processor 150) may display an image corresponding to the location of the second object. For example, the electronic device 100 may display, in the region corresponding to the first object (or the region where the first object is displayed), an image corresponding to the location of the second object (or the location where the user input is applied), among the plurality of images included in the image group.

According to an embodiment, the electronic device 100 may copy images stored in the first memory 130 to the second memory 140 to display at least one image included in the image group on the display 120. According to an embodiment, the electronic device 100 may display a list of image groups displayed on the display 120.

According to an embodiment, in operation 1160, the electronic device 100 may determine whether the location of the user input is changed.

According to an embodiment, when it is determined that the location of the user input is changed, the electronic device 100 (e.g., the processor 150) may, in operation 1170, display the second object by changing the location of the second object. According to an embodiment, when the location of the user input is changed, the electronic device 100 may change the location of the second object, depending on the changed location of the user input. According to an embodiment, the electronic device 100 may set a location change unit for the second object, depending on the number of images included in the image group that corresponds to the first object to which the user input is applied. According to an embodiment, the second object may be moved based on the location change unit. According to an embodiment, the second object may be moved along a path that is different from the third object representing a moving path of the second object.

According to an embodiment, when the location of the user input is changed, the electronic device 100 may change at least one of the shape and size of the second object (or the third object).

According to an embodiment, when the area of the user input is changed, the electronic device 100 may change at least one of the shape and size of the second object (or the third object).

According to an embodiment, in operation 1180, the electronic device 100 (e.g., the processor 150) may display an image corresponding to the location of the second object. For example, when the location of the second object is changed, the electronic device 100 may display an image corresponding to the changed location of the second object (or the location of the user input), among the plurality of images included in the image group.

According to an embodiment, in operation 1190, the electronic device 100 (e.g., the processor 150) may determine whether the user input is completed. For example, the electronic device 100 may determine whether a touch-up event occurs. According to an embodiment, when the determination result in operation 1190 shows that the user input is not completed, the electronic device 100 (e.g., the processor 150) may, in operation 1160, determine whether the location of the user input is changed.

Figure 12:
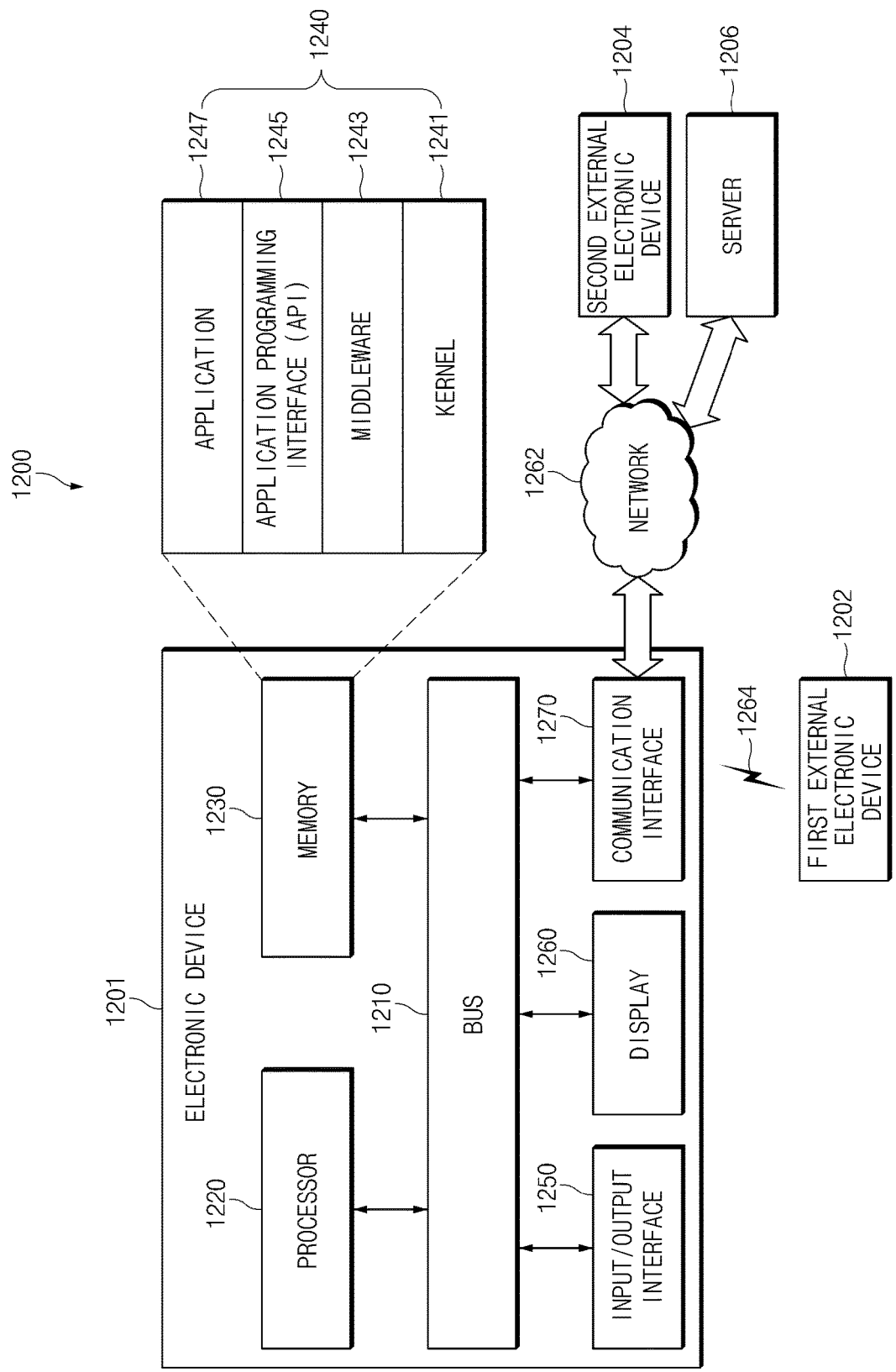
FIG. 12 illustrates an electronic device in a network environment according to various embodiments of the present disclosure.

FIG. 12 is a view illustrating an electronic device in a network environment system, according to various embodiments of the present disclosure.

Referring to FIG. 12, according to various embodiments, an electronic device 1201 in a network environment 1200 will be described. For example, the electronic device 1201 may all or part of the electronic device 100 illustrated in FIG. 1. The electronic device 1201 may include a bus 1210, a processor 1220, a memory 1230, an input/output interface 1250, a display 1260, and a communication interface 1270.

According to an embodiment, the electronic device 1201 may not include at least one of the above-described elements or may further include other element(s).

For example, the bus 1210 may interconnect the above-described elements 1210 to 1270 and may include a circuit for conveying communications (e.g., a control message and/or data) among the above-described elements.

The processor 1220 may include one or more of a central processing unit (CPU), an application processor (AP), or a communication processor (CP). For example, the processor 1220 may perform an arithmetic operation or data processing associated with control and/or communication of at least other elements of the electronic device 1201.

The memory 1230 may include a volatile and/or nonvolatile memory. For example, the memory 1230 may store commands or data associated with at least one other element(s) of the electronic device 1201. According to an embodiment, the memory 1230 may store software and/or a program 1240.

The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)".

For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete elements of the electronic device 1201 so as to control or manage system resources.

The middleware 1243 may perform, for example, a mediation role such that the API 1245 or the application program 1247 communicates with the kernel 1241 to exchange data. Furthermore, the middleware 1243 may process task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247 and may process the one or more task requests.

The API 1245 may be, for example, an interface through which the application program 1247 controls a function provided by the kernel 1241 or the middleware 1243, and may include, for example, at least one interface or function (e.g., an instruction) for a file control, a window control, image processing, a character control, or the like.

The input/output interface 1250 may play a role, for example, of an interface which transmits a command or data input from a user or another external device, to other element(s) of the electronic device 1201. Furthermore, the input/output interface 1250 may output a command or data, received from other element(s) of the electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may establish communication between the electronic device 1201 and an external device (e.g., the first external electronic device 1202, the second external electronic device 1204, or the server 1206). For example, the communication interface 1270 may be connected to the network 1262 over wireless communication or wired communication to communicate with the external device (e.g., the second external electronic device 1204 or the server 1206).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1264. The short range communication 1264 may include at least one of wireless fidelity (Wi-Fi), Bluetooth, Bluetooth low energy (BLE), Zigbee, near field communication (NFC), magnetic stripe transmission (MST), a global navigation satellite system (GNSS), or the like. The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used.

The wired communication may include at least one of, for example, a universal serial bus (USB), a high definition multimedia interface (HDMI), a recommended standard-232 (RS-232), power line communication, a plain old telephone service (POTS), or the like. The network 1262 may include at least one of telecommunications networks, for example, a computer network (e.g., LAN or WAN), an Internet, or a telephone network.

Each of the first and second external electronic devices 1202 and 1204 may be a device of which the type is different from or the same as that of the electronic device 1201. According to an embodiment, the server 1206 may include a group of one or more servers. According to various embodiments, all or a portion of operations that the electronic device 1201 will perform may be executed by another or plural electronic devices (e.g., the first external electronic device 1202, the second external electronic device 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 1201 from another device (e.g., the first or second external electronic device 1202 or 1204 or the server 1206). The other electronic device (e.g., the first or second external electronic device 1202 or 1204 or the server 1206) may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
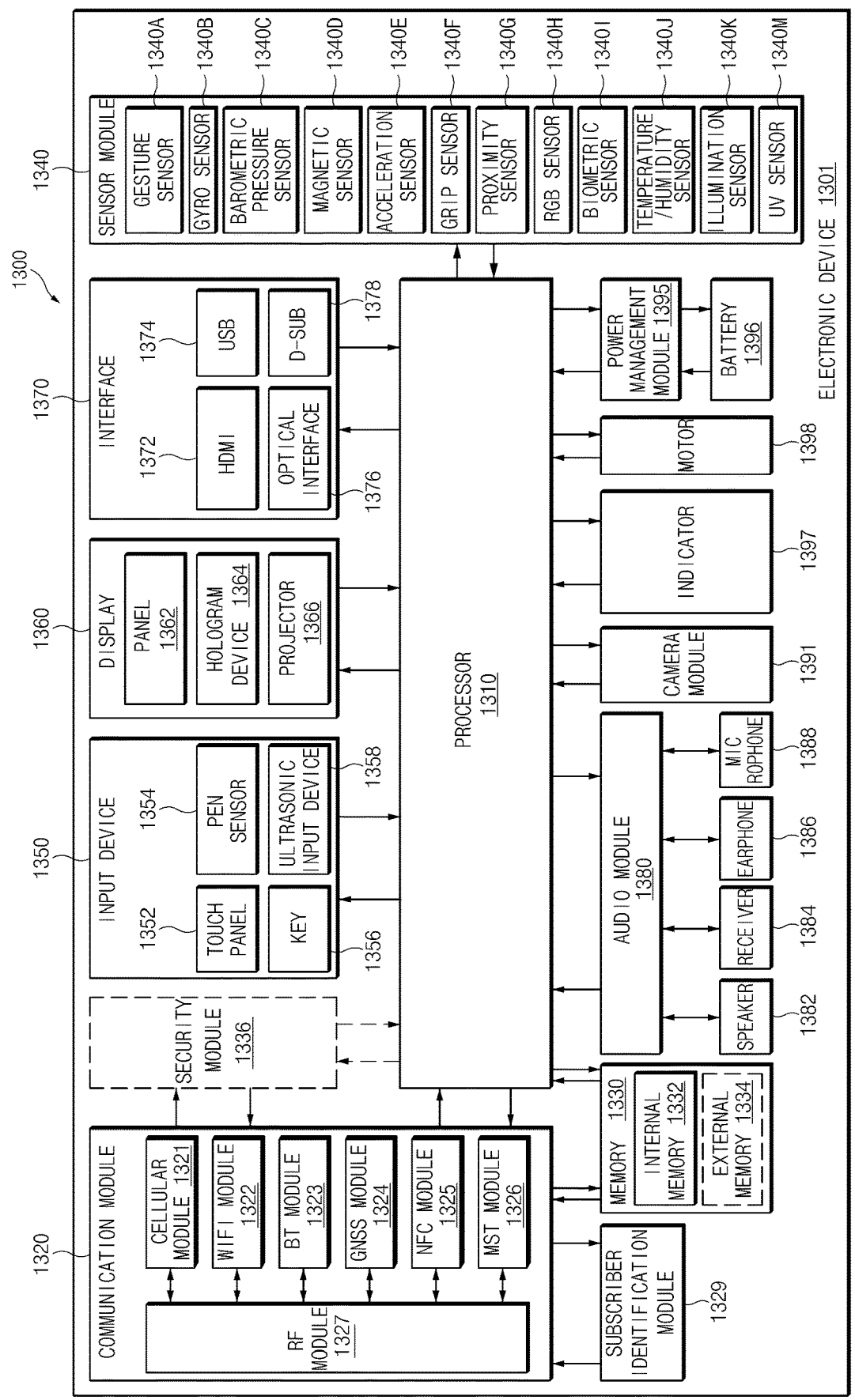
FIG. 13 illustrates a block diagram of an electronic device according to various embodiments.

FIG. 13 illustrates a block diagram of an electronic device, according to various embodiments.

An electronic device 1301 may include, for example, all or a part of the electronic device 100 illustrated in FIG. 1. The electronic device 1301 may include one or more processors (e.g., an application processor (AP)) 1310, a communication module 1320, a subscriber identification module 1329, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an operating system (OS) or an application to control a plurality of hardware or software elements connected to the processor 1310 and may process and compute a variety of data. For example, the processor 1310 may be implemented with a System on Chip (SoC). According to an embodiment, the processor 1310 may further include a graphic processing unit (GPU) and/or an image signal processor. The processor 1310 may include at least a part (e.g., a cellular module 1321) of elements illustrated in FIG. 13. The processor 1310 may load a command or data, which is received from at least one of other elements (e.g., a nonvolatile memory), into a volatile memory and process the loaded command or data. The processor 1310 may store a variety of data in the nonvolatile memory.

The communication module 1320 may be configured the same as or similar to the communication interface 1270 of FIG. 12. The communication module 1320 may include the cellular module 1321, a WiFi module 1322, a Bluetooth (BT) module 1323, a GNSS module 1324 (e.g., a GPS module, a Glonass module, a Beidou module, or a Galileo module), a near field communication (NFC) module 1325, a MST module 1326 and a radio frequency (RF) module 1327.

The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the subscriber identification module (e.g., a SIM card) 1329. According to an embodiment, the cellular module 1321 may perform at least a portion of functions that the processor 1310 provides. According to an embodiment, the cellular module 1321 may include a communication processor (CP).

Each of the WiFi module 1322, the BT module 1323, the GNSS module 1324, the NFC module 1325, or the MST module 1326 may include a processor for processing data exchanged through a corresponding module, for example. According to an embodiment, at least a part (e.g., two or more) of the cellular module 1321, the WiFi module 1322, the BT module 1323, the GNSS module 1324, the NFC module 1325, or the MST module 1326 may be included within one Integrated Circuit (10) or an IC package.

For example, the RF module 1327 may transmit and receive a communication signal (e.g., an RF signal). For example, the RF module 1327 may include a transceiver, a power amplifier module (PAM), a frequency filter, a low noise amplifier (LNA), an antenna, or the like. According to another embodiment, at least one of the cellular module 1321, the WiFi module 1322, the BT module 1323, the GNSS module 1324, the NFC module 1325, or the MST module 1326 may transmit and receive an RF signal through a separate RF module.

The subscriber identification module 1329 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1330 (e.g., the memory 1230) may include an internal memory 1332 or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

A security module 1336 (or secure memory) may be a module that includes a storage space of which a security level is higher than that of the memory 1330 and may be a circuit that guarantees safe data storage and a protected execution environment. The security module 1336 may be implemented with a separate circuit and may include a separate processor. For example, the security module 1336 may be in a smart chip or a secure digital (SD) card, which is removable, or may include an embedded secure element (eSE) embedded in a fixed chip of the electronic device 1301. Furthermore, the security module 1336 may operate based on an operating system (OS) that is different from the OS of the electronic device 1301. For example, the security module 1336 may operate based on java card open platform (JCOP) OS. The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Although not illustrated, additionally or alternatively, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, a keypad, or the like. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 1260) may include a panel 1362, a hologram device 1364, or a projector 1366. The panel 1362 may be the same as or similar to the display 1260 illustrated in FIG. 12. The panel 1362 may be implemented, for example, to be flexible, transparent or wearable. The panel 1362 and the touch panel 1352 may be integrated into a single module. According to an embodiment, the panel 1362 may include a pressure sensor (or force sensor, interchangeably used hereinafter) that measures the intensity of touch pressure by a user. The pressure sensor may be implemented integrally with the touch panel 1352, or may be implemented as at least one sensor separately from the touch panel 1352. The hologram device 1364 may display a stereoscopic image in a space using a light interference phenomenon. The projector 1366 may project light onto a screen so as to display an image. For example, the screen may be arranged in the inside or the outside of the electronic device 1301. According to an embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-sub-miniature (D-sub) 1378. The interface 1370 may be included, for example, in the communication interface 1270 illustrated in FIG. 12. Additionally or alternatively, the interface 1370 may include, for example, a mobile high definition link (MHL) interface, a SD card/multi-media card (MMC) interface, or an infrared data association (IrDA) standard interface.

The audio module 1380 may convert a sound and an electric signal in dual directions. The audio module 1380 may process, for example, sound information that is input or output through a speaker 1382, a receiver 1384, an earphone 1386, or the microphone 1388.

For example, the camera module 1391 may shoot a still image or a video. According to an embodiment, the camera module 1391 may include at least one or more image sensors (e.g., a front sensor or a rear sensor), a lens, an image signal processor (ISP), or a flash (e.g., an LED or a xenon lamp).

The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. Although not illustrated, a processing device (e.g., a GPU) for supporting a mobile TV may be included in the electronic device 1301. The processing device for supporting the mobile TV may process media data according to the standards of digital multimedia broadcasting (DMB), digital video broadcasting (DVB), MediaFlo™, or the like.

Figure 14:
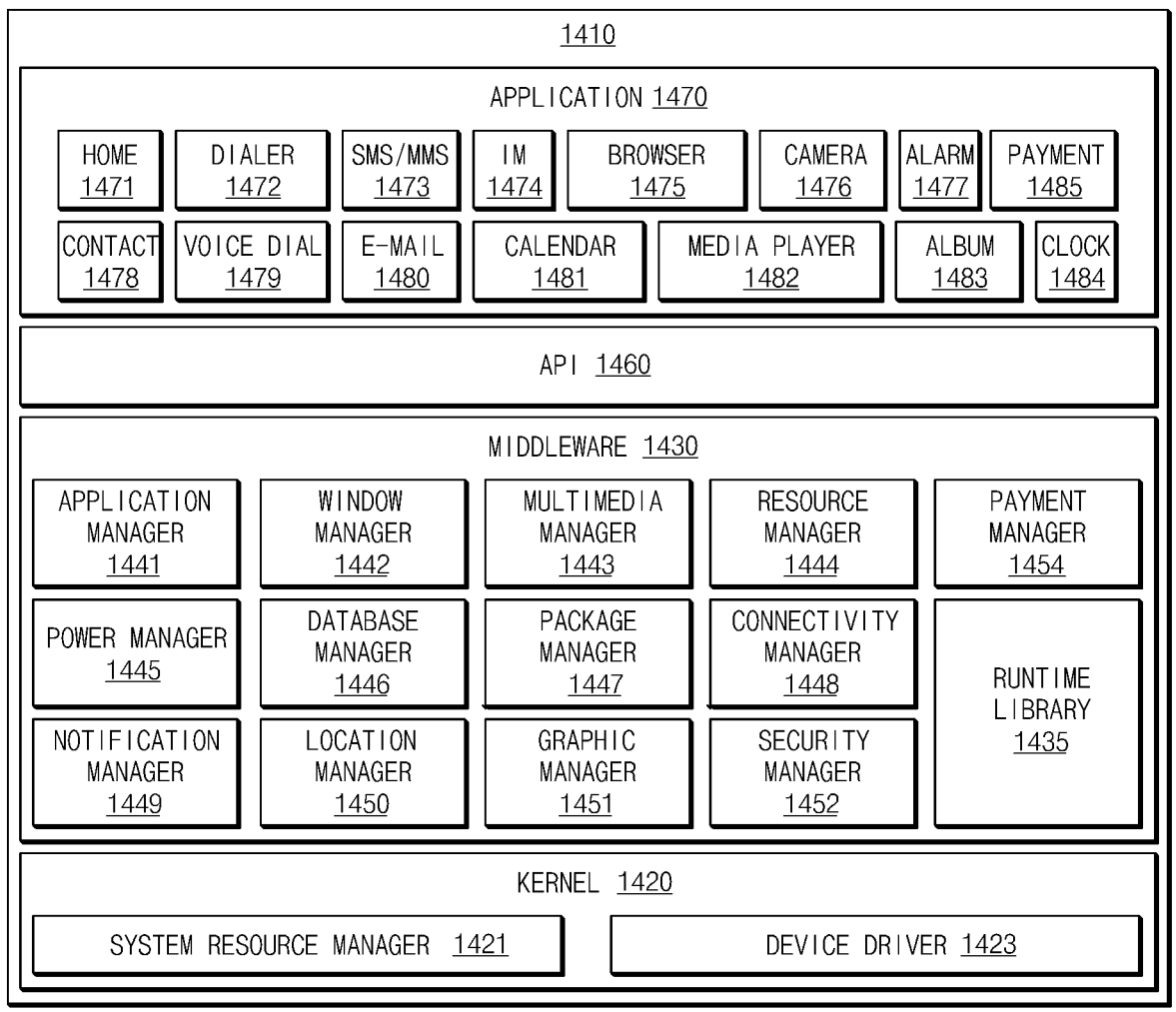
FIG. 14 illustrates a block diagram of a program module according to various embodiments.

FIG. 14 illustrates a block diagram of a program module, according to various embodiments.

According to an embodiment, a program module 1410 (e.g., the program 1240) may include an operating system (OS) to control resources associated with an electronic device (e.g., the electronic device 1401), and/or diverse applications (e.g., the application program 1247) driven on the OS. The OS may be, for example, Android™, iOS™, Windows™, Symbian™, Tizen™, or Bada™.

The program module 1410 may include a kernel 1420, a middleware 1430, an application programming interface (API) 1460, and/or an application 1470. At least a portion of the program module 1410 may be preloaded on an electronic device or may be downloadable from an external electronic device (e.g., the first external electronic device 1202, the second external electronic device 1204, the server 1206, or the like).

The kernel 1420 (e.g., the kernel 1241) may include, for example, a system resource manager 1421 or a device driver 1423. The system resource manager 1421 may perform control, allocation, or retrieval of system resources. According to an embodiment, the system resource manager 1421 may include a process managing unit, a memory managing unit, or a file system managing unit. The device driver 1423 may include, for example, a display driver, a camera driver, a Bluetooth driver, a shared memory driver, a USB driver, a keypad driver, a Wi-Fi driver, an audio driver, or an interprocess communication (IPC) driver.

The middleware 1430 may provide, for example, a function that the application 1470 needs in common, or may provide diverse functions to the application 1470 through the API 1460 to allow the application 1470 to efficiently use limited system resources of the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager 1454.

The runtime library 1435 may include, for example, a library module that is used by a compiler to add a new function through a programming language while the application 1470 is being executed. The runtime library 1435 may perform input/output management, memory management, or capacities about arithmetic functions.

The application manager 1441 may manage, for example, a life cycle of at least one application of the application 1470. The window manager 1442 may manage a graphic user interface (GUI) resource that is used in a screen. The multimedia manager 1443 may identify a format necessary for playing diverse media files, and may perform encoding or decoding of media files by using a codec suitable for the format. The resource manager 1444 may manage resources such as a storage space, memory, or source code of at least one application of the application 1470.

The power manager 1445 may operate, for example, with a basic input/output system (BIOS) to manage a battery or power, and may provide power information for an operation of an electronic device. The database manager 1446 may generate, search for, or modify database that is to be used in at least one application of the application 1470. The package manager 1447 may install or update an application that is distributed in the form of package file.

The connectivity manager 1448 may manage, for example, wireless connection such as Wi-Fi or Bluetooth. The notification manager 1449 may display or notify an event such as arrival message, appointment, or proximity notification in a mode that does not disturb a user. The location manager 1450 may manage location information about an electronic device. The graphic manager 1451 may manage a graphic effect that is provided to a user, or manage a user interface relevant thereto. The security manager 1452 may provide a general security function necessary for system security, user authentication, or the like. According to an embodiment, in the case where an electronic device (e.g., the electronic device 1401) includes a telephony function, the middleware 1430 may further include a telephony manager for managing a voice or video call function of the electronic device.

The middleware 1430 may include a middleware module that combines diverse functions of the above-described elements. The middleware 1430 may provide a module specialized to each OS kind to provide differentiated functions. Additionally, the middleware 1430 may dynamically remove a part of the preexisting elements or may add new elements thereto.

The API 1460 (e.g., the API 1245) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1470 (e.g., the application program 1247) may include, for example, one or more applications capable of providing functions for a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, a timepiece 1484, and a payment 1485 or for offering health care (e.g., measuring an exercise quantity, blood sugar, or the like) or environment information (e.g., information of barometric pressure, humidity, temperature, or the like).

According to an embodiment, the application 1470 may include an application (hereinafter referred to as "information exchanging application" for descriptive convenience) to support information exchange between an electronic device (e.g., the electronic device 1201) and an external electronic device (e.g., the first external electronic device 1202 or the second external electronic device 1204). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the first external electronic device 1202 or the second external electronic device 1204). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 1202 or 1204) which communicates with the electronic device (e.g., the electronic device 1201), an application running in the external electronic device, or a service (e.g., a call service, a message service, or the like) provided from the external electronic device.

According to an embodiment, the application 1470 may include an application (e.g., a health care application of a mobile medical device) that is assigned in accordance with an attribute of an external electronic device (e.g., the first external electronic device 1202 or the second external electronic device 1204). According to an embodiment, the application 1470 may include an application that is received from an external electronic device (e.g., the first external electronic device 1202, the second external electronic device 1204, or the server 1206). According to an embodiment, the application 1470 may include a preloaded application or a third party application that is downloadable from a server. The names of elements of the program module 1410 according to the embodiment may be modifiable depending on kinds of operating systems.

According to various embodiments, at least a portion of the program module 1410 may be implemented by software, firmware, hardware, or a combination of two or more thereof. At least a portion of the program module 1410 may be implemented (e.g., executed), for example, by the processor (e.g., the processor 150 of FIG. 1). At least a portion of the program module 1410 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 150 of FIG. 1), may cause the one or more processors to perform a function corresponding to the instruction. The computer-readable storage media, for example, may be a memory (e.g., the memory 130 of FIG. 1).

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added. While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   and
   a processor,
   wherein the processor is configured to:
      create an image group including a plurality of images, according to a specified condition;
      control to display, on the display, a first object representing the image group;
      detect a user input applied to the first object,
      in response to detecting the user input, display a second object for browsing through the plurality of images included in the image group at a location on the first object corresponding to a location where the user input is applied, the second object being moveable along a path of locations in a region corresponding to the first object, a start of the path being associated with a first image in the image group, an end of the path being associated with a last image in the image group, and an initial location of the second object on the path corresponding to the location where the user input is applied;
      select, for display in the region corresponding to the first object, an image from among the images in the image group, based on the initial location of the second object on the path.

2. The electronic device of claim 1, wherein the processor is configured to control to differently display at least one of a shape or a size of the second object, depending on an attribute of the image group represented by the first object.

3. The electronic device of claim 1, wherein the processor is configured to:
   change the location of the second object, based on change in location of the under input; and
   control to display, in the region corresponding to the first object, another image, from the plurality of images included in the image group, corresponding to the changed location of the second object.

4. The electronic device of claim 3, wherein the processor is configured to:
   set a location change unit of the second object, based on a number of images included in the image group represented by the first object; and
   change the location of the second object based on the change in location of the user input, in accordance with the set location change unit.

5. The electronic device of claim 3, further comprising:
   a volatile memory,
   wherein the processor is configured to:
      set a location change unit of the second object to a first unit size when the first object representing the image group is displayed on the display;
      store an image corresponding to the first unit size in the volatile memory;
      set the location change unit of the second object to a second unit size that is less than the first unit size; and
      store an image corresponding to the second unit size in the volatile memory.

6. The electronic device of claim 1, wherein the processor is configured to:
   determine a start point and an end point of the user input, when the user input is completed; and
   control to sequentially display, in the region corresponding to the first object, at a specified time interval, images corresponding to location between the start point and the end point.

7. A display method of an electronic device, the method comprising:
   creating an image group including a plurality of images according to a specified condition;
   displaying, on a display, a first object representing the image group;
   detecting a user input applied to the first object;
   in response to detecting the user input, displaying a second object for browsing through the plurality of images included in the image group at a location on the first object corresponding to a location where the user input is applied, the second object being moveable associated with a first image in the image group, an end of the path being associated with a last image in the image group, and an initial location of the second object on the path corresponding to the location where the user input is applied;
   selecting, for display in the region corresponding to the final object, an image from among the images in the image group, based on the initial location of the second object on the path.

8. The method of claim 7, further comprising:
   identifying an attribute of the image group represented by the first object; and
   differently displaying at least one of a shape or a size of the second object, depending on the identified attribute.

9. The method of claim 7, further comprising:
   changing the location of the second object, based on change location of the user input; and
   displaying, in the region corresponding to the first object, another image, from among the plurality of images included in the image group, corresponding to the changed location of the second object.

10. The method of claim 9, further comprising:
   setting a location change unit of the second object, based on a number of images included in the image group represented by the first object; and changing the location of the second object, based on the change in location of the user input, in accordance with the set location change unit.

11. The method of claim 9, further comprising:
setting a location change unit of the second object to a first unit size when the first object representing the image group is displayed on the display;
storing an image corresponding to the first unit size in a volatile memory;
setting the location change unit of the second object to a second unit size that is less than the first unit size; and
storing an image corresponding to the second unit size in the volatile memory.

12. An electronic device comprising:
a display;
a memory configured to store a plurality of images including a first image and a second image; and
a processor,
wherein the processor is configured to:
display, on the display, a first object representing to an image group including the first image and the second image;
detect a user input applied to the first object; and
differently display, on the display, a location, a shape, or a size of a second object for browsing through the first image or the second image, depending on a type of the user input.

13. The electronic device of claim 12, wherein the processor is configured to:
when the user input is applied to a first location of the first object, display the second object in a first region corresponding to the first location; and
when the user input is applied to a second location of the first object, display the second object in a second region corresponding to the second location.

* * * * *